(12) United States Patent
Wang et al.

(10) Patent No.: US 9,628,820 B2
(45) Date of Patent: Apr. 18, 2017

(54) POC VALUE DESIGN FOR MULTI-LAYER VIDEO CODING

(71) Applicant: QUALCOMM Incorporated, San Diego, CA (US)

(72) Inventors: Ye-Kui Wang, San Diego, CA (US); Fnu Hendry, Poway, CA (US); Adarsh Krishnan Ramasubramonian, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 14/543,470

(22) Filed: Nov. 17, 2014

(65) Prior Publication Data

US 2015/0139320 A1    May 21, 2015

Related U.S. Application Data

(60) Provisional application No. 61/906,373, filed on Nov. 19, 2013.

(51) Int. Cl.
*H04N 11/08*    (2006.01)
*H04N 19/70*    (2014.01)
*H04N 19/30*    (2014.01)
*H04N 19/68*    (2014.01)

(52) U.S. Cl.
CPC ............. *H04N 19/70* (2014.11); *H04N 19/30* (2014.11); *H04N 19/68* (2014.11)

(58) Field of Classification Search
USPC ..................................... 375/240.01–240.29
See application file for complete search history.

(56) References Cited

U.S. PATENT DOCUMENTS

| | | | |
|---|---|---|---|
| 2013/0094772 A1 | 4/2013 | Deshpande et al. | |
| 2014/0247883 A1* | 9/2014 | Lee | H04N 19/513 375/240.16 |
| 2014/0301439 A1 | 10/2014 | Chen et al. | |
| 2015/0063463 A1* | 3/2015 | Choi | H04N 19/70 375/240.25 |

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.

(Continued)

*Primary Examiner* — Leron Beck
(74) *Attorney, Agent, or Firm* — Shumaker & Sieffert, P.A.

(57) ABSTRACT

A device for coding video data includes a memory comprising a decoded picture buffer (DPB) configured to store video data, and a video coder configured to code data representative of a value for a picture order count (POC) resetting period identifier, wherein the data is included in a slice segment header for a slice associated with a coded picture of a layer of video data, and wherein the value of the POC resetting period identifier indicates a POC resetting period including the coded picture, and reset at least part of a POC value for the coded picture in the POC resetting period in the layer and POC values for one or more pictures in the layer that are currently stored in the DPB.

42 Claims, 5 Drawing Sheets

(56) References Cited

OTHER PUBLICATIONS

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14 through 22, 2011, (Joint Collaborative Team on Video Coding of ISO/IEC JTC1/SC29/WG11 and ITU-T SG.16); JCTVC-F803_d2, Oct. 4, 2011, 226 pp.
Bross et al., "WD5: Working Draft 5 of High-Efficiency Video Coding," 7th Meeting: Geneva, Switzerland, Nov. 21 through 30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1 through 10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11 through 20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10 through 19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14 through 23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, the International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, the International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, the International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, the International Telecommunication Union. Apr. 2015, 634 pp.
Chen et al., "High efficient video coding (HEVC) scalable extension Draft 4," JCT-VC Meeting; Oct. 23-Nov. 1, 2013, Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-O1008_v1, XP030115462, Nov. 14, 2013, 74 pp.
Chen et al., "MV-HEVC/SHVC HLS: Cross-layer POC alignment," JCT-3V Meeting; Jul. 25-Aug. 2, 2013; Vienna; (The Joint Collaborative Team on 3D Video Coding Extension Development of ISO/IEC JTC1/SC29/WG11 and ITU-T SG.16); No. JCTVC-N0244, XP030131078, Jul. 16, 2013, 4 pp.
International Search Report and Written Opinion—PCT/US2014/066130—ISA/EPO—Feb. 5, 2015.
Sjoberg et al., "Overview of HEVC High-Level Syntax and Reference Picture Management," IEEE Transactions on Circuits and Systems for Video Technology, vol. 22, No. 12, XP011487804, Dec. 2012, pp. 1858-1870.
Tech et al., "Preliminary version of MV-HEVC Draft Text 6," JCT-3V Meeting; Geneva; Oct. 25-Nov. 1; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-F1004v1, XP030131734, Nov. 7, 2013, 84 pp.
Wang, "MV-HEVC/SHVC HLS: Summary of contributions on POC," JCT-VC Meeting; Oct. 23-Nov. 1, 2013; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-O0343r1, XP030115422, Oct. 10, 2013, 7 pp.
ITU-T H.264, Series H: Audiovisual and Multimedia Systems, Infrastructure of audiovisual services—Coding of moving video, Advanced video coding for generic audiovisual services, the International Telecommunication Union, Mar. 2005, 343 pp.
Tech et al., "MV-HEVC Draft Text 3 (ISO/IEC 23008-2:201x/PDAM2)," Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, Document No. JCT3V-C1004_d3, Mar. 19, 2013, 34 pp.
Tech et al., "MV-HEVC Draft Text 5," Joint Collaborative Team on 3D Video Coding Extension Development of ITU-T SG 16 WP 3 and ISO/IEC JTC 1/SC 29/WG 11, Jul. 27-Aug. 2, 2013, Document No. JCT3V-E1004-v6, Aug. 7, 2013, 65 pp.
Tech et al., "Preliminary version of MV-HEVC Draft Text 6," Joint Collaborative Team on 3D Video Coding Extension Development of ITU-T SG 16 WP 3 and ISO/IEC JTC 1/SC 29/WG 11, Oct. 25-Nov. 1, 2013, Document No. JCT3V-F1004-v3, Nov. 18, 2013, 90 pp.
Chen et al., "SHVC Draft Text 1," Joint Collaborative Team on Video Coding (JCT-VC) of ITU-T SG16 WP3 and ISO/IEC JTC1/SC29/WG11, Jan. 14-23, 2013, Document: JCTVC-L1008, Mar. 20, 2013, 34 pp.
Sjoberg et al., "HLS: Error robust POC alignment," Joint Collaborative Team on Video Coding (JCT-VC) of ITU-T SG 16 WP 3 and ISO/IEC JTC 1/SC 29/WG 11, Oct. 23-Nov. 1, 2013, Document No. JCTVC-O0176v3, m30941, Oct. 28, 2013, 8 pp.
Wang et al., "High Efficiency Video Coding (HEVC) Defect Report 2," Joint Collaborative Team on Video Coding (JCT-VC) of ITU-T SG 16 WP 3 and ISO/IEC JTC 1/SC 29/WG 11, Oct. 23-Nov. 1, 2013, Document: JCTVC-O1003_v1, Nov. 19, 2013, 311 pp.
Hannuksela et al., "MV-HEVC/SHVC HLS: on POC value derivation," Joint Collaborative Team on Video Coding (JCT-VC) of ITU-T SG 16 WP 3 and ISO/IEC JTC 1/SC 29/WG 11, Document: JCTVC-O0275, Oct. 15, 2013, 2 pp.
Hannuksela et al., "MV-HEVC/SHVC HLS: on POC value derivation," Joint Collaborative Team on Video Coding (JCT-VC) of ITU-T SG 16 WP 3 and ISO/IEC JTC 1/SC 29/WG 11, Document: JCTVC-O0275v3, Nov. 13, 2013, 6 pp.
Second Written Opinion of International Application No. PCT/US2014/066130, mailed Oct. 28, 2015, 10 pp.
International Preliminary Report on Patentability from International Application No. PCT/US2014/066130, mailed Jan. 28, 2016, 17 pp.
Response to Written Opinion mailed Feb. 5, 2015, from International Application No. PCT/US2014/066130, dated Sep. 18, 2015, 7 pp.
Response to Second Written Opinion mailed Oct. 28, 2015, from International Application No. PCT/US2014/066130, dated Dec. 28, 2015, 4 pp.
Hannuksela et al., "MV-HEVC/SHVC HLS: on POC value derivation," Joint Collaborative Team on Video Coding (JCT-VC) of ITU-T SG 16 WP 3 and ISO/IEC JTC 1/SC 29/WG 11, Document: JCTVC-O0275v2, Oct. 27, 2013, 3 pp.

* cited by examiner

POC VALUE DESIGN FOR MULTI-LAYER VIDEO CODING

This application claims the benefit of U.S. Provisional Application No. 61/906,373, filed Nov. 19, 2013, which is hereby incorporated by reference in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for improved picture order count (POC) signalling and derivation in multi-layer video coding. In particular, this disclosure described a POC signalling and derivation design that may improve error resilience and provides support for missing-collocated-picture scenarios where in one access unit there is an IRAP picture in one layer but no picture at all for another layer. These techniques may be used when coding single layer video data or multi-layer video data. In general, these techniques include signaling a POC resetting period identifier, which indicates a POC resetting period in which a slice occurs. As discussed in greater detail below, video coders may be configured to perform a POC value reset upon first obtaining a slice having a new POC resetting period identifier. Video coders may be configured to perform a POC value reset (e.g., of a picture in the POC resetting period and pictures in the same layer as the picture including the new POC resetting period identifier that are currently stored in a decoded picture buffer) once per POC resetting period. In this manner, if a POC anchor picture is lost or corrupted or did not exist at all, POC values for the subsequent pictures in the same layer can still be recovered, and consequently reference pictures can correctly be identified and pictures can be output in correct order.

In one example, a method of decoding video data includes decoding, by a video decoder, data representative of a value for a picture order count (POC) resetting period identifier, wherein the data is associated with a coded picture of a layer of video data, and wherein the value of the POC resetting period identifier indicates a POC resetting period including the coded picture, and resetting, by the video decoder, at least part of a POC value for the coded picture and POC values for one or more pictures in the layer that are currently stored in a decoded picture buffer (DPB) of the video decoder.

In another example, a method of encoding video data includes encoding, by a video encoder, data representative of a value for a picture order count (POC) resetting period identifier, wherein the data is associated with a coded picture of a layer of video data, and wherein the value of the POC resetting period identifier indicates a POC resetting period including the coded picture, and resetting, by the video encoder, at least part of a POC value for the coded picture and POC values for one or more pictures in the layer that are currently stored in a decoded picture buffer (DPB) of the video decoder.

In another example, a device for coding video data includes a memory comprising a decoded picture buffer (DPB) configured to store video data, and a video coder configured to code data representative of a value for a picture order count (POC) resetting period identifier, wherein the data is associated with a coded picture of a layer of video data, and wherein the value of the POC resetting period identifier indicates a POC resetting period including the coded picture, and reset at least part of a POC value for the coded picture and POC values for one or more pictures in the layer that are currently stored in the DPB.

In another example, a device for coding video data includes means for coding data representative of a value for a picture order count (POC) resetting period identifier, wherein the data is associated with a coded picture of a layer of video data, and wherein the value of the POC resetting period identifier indicates a POC resetting period including the coded picture, and means for resetting at least part of a POC value for the coded picture and POC values for one or more pictures in the layer that are currently stored in a decoded picture buffer (DPB) of the video decoder.

In another example, a computer-readable storage medium has stored thereon instructions that, when executed, cause a processor of a device for coding video data to code data representative of a value for a picture order count (POC) resetting period identifier, wherein the data is associated with a coded picture of a layer of video data, and wherein the value of the POC resetting period identifier indicates a POC resetting period including the coded picture, and reset at least part of a POC value for the coded picture and POC values for one or more pictures in the layer that are currently stored in a decoded picture buffer (DPB) of the video decoder.

The details of one or more examples are set forth in the accompanying drawings and the description below. Other features, objects, and advantages will be apparent from the description and drawings, and from the claims.

DETAILED DESCRIPTION

Figure 1:
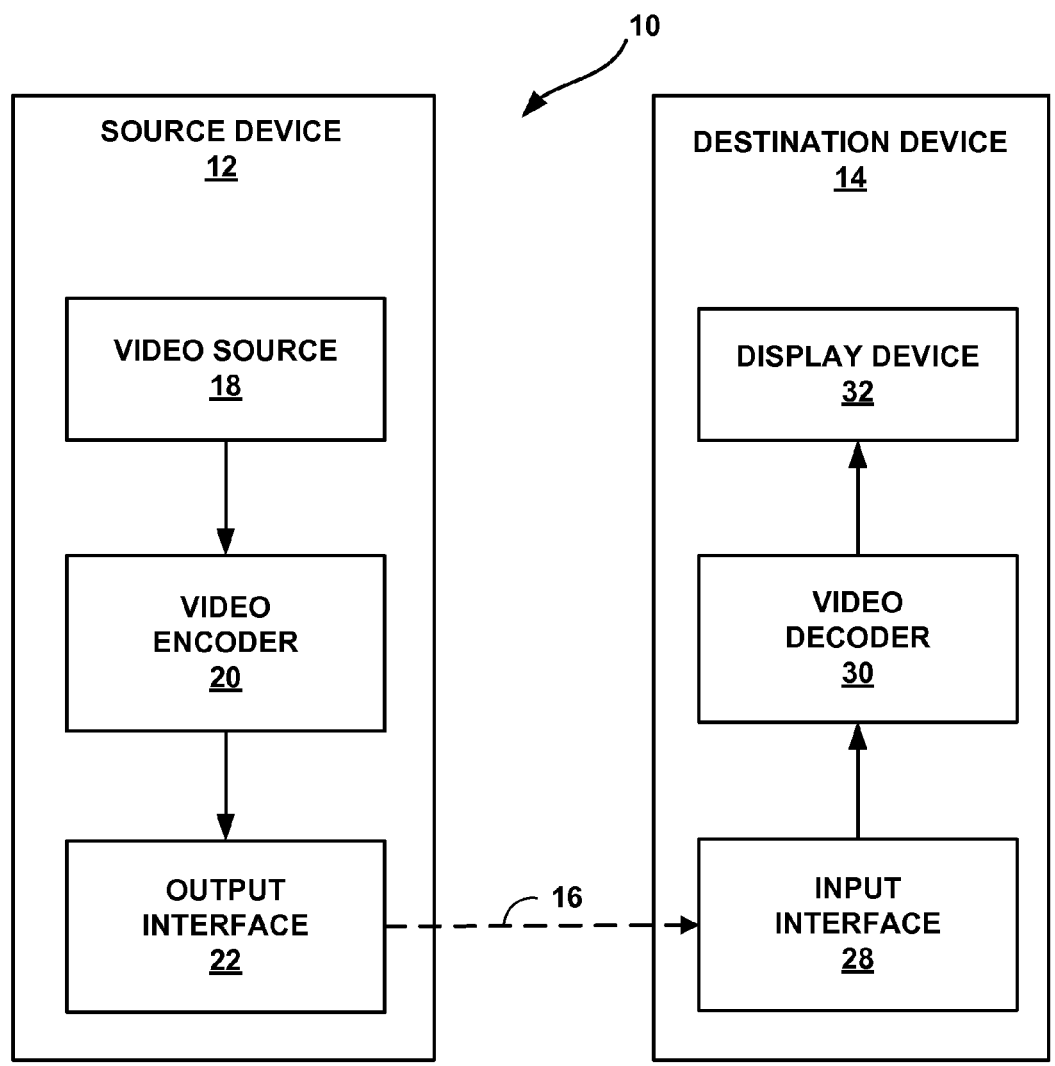
FIG. 1 is a block diagram illustrating an example video encoding and decoding system that may utilize techniques for coding POC value information according to the techniques of this disclosure.

In general, this disclosure describes a picture order count (POC) value design for video coding, which may be beneficial for multi-layer video coding. This disclosure describes various design improvements for signaling and derivation of POC values in multi-layer video coding. The techniques of this disclosure may also be applied to single-layer video coding.

POC values are generally used to identify pictures and to control the output of decoded pictures in correct order. For example, when a block of a current picture is inter-predicted relative to a reference picture, the reference picture may be identified using a POC value for the reference picture. More particularly, POC values for reference pictures to be included in a reference picture list may be signaled in a parameter set, such as sequence parameter set (SPS), picture parameter set (PPS), and/or a slice header corresponding to the block. In this manner, a video encoder may identify a reference picture by signaling an index into the reference picture list corresponding to the position of the reference picture in the reference picture list, and a video decoder may identify the reference picture by constructing the reference picture list (based on the POC values) and using the reference index to identify the position of a reference picture in the reference picture list.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. Recently, the design of a new video coding standard, namely High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available from http://phenix.int-evey.fr/jct/doc_end_user/documents/ 15_Geneva/wg11/JCTVC-O1003-vi.zip. The multiview extension to HEVC, namely MV-HEVC, is also being developed by the JCT-3V. A recent Working Draft (WD) of MV-HEVC, referred to as MV-HEVC WD6 hereinafter, is available from http://phenix.it-sudparis.eu/jct2/doc_end_user/documents/6_Geneva/wg11/JCT3V-F1004-v3.zip. The scalable extension to HEVC, named SHVC, is also being developed by the JCT-VC. A recent Working Draft (WD) of SHVC and referred to as SHVC WD4 hereinafter, is available from http://phenix.int-evey.fr/jct/doc_end_user/ documents/15_Geneva/wg11/JCTVC-O1008-v1.zip.

A POC value, represented by PicOrderCntVal, for a particular coded picture denotes the picture's relative order in the picture output process with respect to other pictures in the same coded video sequence. The POC value includes least significant bits (LSB) and most significant bits (MSB); the POC is obtained by concatenating the MSB with the LSB. The LSB may be signaled in the slice header, and the MSB may be computed by the decoder based on the NAL unit type of the current picture and the MSB and LSB of the previous picture in decoding order that is not of NAL unit type random access skipped leading (RASL) or random access decodable leading (RADL), or is not a sub-layer non-reference picture, but has a temporal_id value that is equal to 0. Such pictures that have Temporand equal to 0 and nuh_layer_id equal to nuh_layer_id of the current picture and that are not RASL pictures, RADL pictures, or sub-layer non-reference pictures, will henceforth be referred to as POC-anchor pictures.

When the current picture is an IRAP picture with NoRaslOutputFlag equal to a value of 1, or a CRA picture that is the first picture of the bitstream, the value of POC MSB is inferred to be equal to 0. In a multi-layer bitstream (e.g., an SHVC or an MV-HEVC bitstream with more than one layer), there may exist access units where one or more than one picture is an IRAP picture and one or more pictures are non-IRAP pictures; such AUs are referred to as non-aligned IRAP AUs. When decoding bitstreams containing non-aligned IRAP AUs, it is often likely that the POC derived for the picture based on the POC LSB values signaled would violate the bitstream requirement that all the pictures in an access unit should have the same value of PicOrderCntVal.

In MV-HEVC WD5, the flag poc_reset_flag can be used to reset the POC of the pictures such that even when non-aligned IRAP AUs are present in the bitstream, the value of PicOrderCntVal of the current picture and the pictures in the DPB would be adjusted such that the POC of all the pictures in an AU are the same.

Chen et al., "CROSS-LAYER POC ALIGNMENT FOR MULTI-LAYER BITSTREAMS THAT MAY INCLUDE NON-ALIGNED IRAP PICTURES," U.S. patent application Ser. No. 14/245,115, filed Apr. 4, 2014, describes another method of achieving a POC reset, which uses two flags: poc_msb_reset_flag and poc_lsb_reset_flag. The former flag resets the MSB of PicOrderCntVal, and the latter flag resets the LSB of the PicOrderCntVal. Both these flags are signaled in the slice header.

U.S. Provisional No. 61/890,868, filed Oct. 14, 2013, proposes an SEI message containing information for recovery of correct POC values when a picture that contains either POC MSB or POC resetting indication is lost.

Document JCTVC-O0275v3, available at http://phenix.int-evey.fr/jct/doc_end_user/documents/15_Geneva/wg11/JCTVC-O0275-v3.zip and JCTVC-O0176v3, available at http://phenix.int-evey.fr/jct/doc_end_user/documents/15_Geneva/wg11/JCTVC-O0176-v3.zip, propose some other methods for signaling and deriving POC values in multi-layer video coding.

Existing POC designs, i.e., existing methods for signalling and deriving POC values in multi-layer video coding, may encounter the following problems: In some methods, the POC derivation for pictures of a particular layer depends on information, such as picture type indicated by the NAL unit type, of pictures from lower layers. Thus, if such a lower layer picture is lost, POC values for some pictures (e.g., pictures of the particular layer) cannot be correctly derived. Use cases such as those in which one access unit includes an IRAP picture in one layer but no picture at all for another layer (referred to as missing-collocated-picture scenarios) would not be supported absent the techniques of this disclosure. Some methods have problems in clearly specifying the POC-dependent persistency scope of some SEI messages or the POC-dependent semantics of some SEI message syntax elements.

The POC value design described in this disclosure includes various aspects, any or all of which may be implemented alone or in any combination. The techniques of this disclosure may overcome one or more of the problems discussed above. In one example, video coders (e.g., video encoders and video decoders) may code (encode or decode) a POC resetting period identifier for, e.g., a slice of video data. The POC resetting period identifier may form part of a slice segment header for a slice to identify a POC resetting period to which the slice corresponds.

Certain techniques of this disclosure are based on the recognition that, at times, a POC value for a current slice (or a current picture including the current slice) may not be determinable, either because a picture having a reference POC value (i.e., a POC value that serves as reference for deriving the POC value for the current slice or the current picture) was lost or was otherwise not received. For instance, an access unit may include data for a picture of a base layer picture, but may not include (e.g., due to loss or omission of) data for an enhancement layer picture. This may result in a POC value not being correctly determinable. Accordingly, a video coder may perform a POC value reset at most once per POC resetting period, which may allow a video decoder to determine POC values, even after receiving an access unit that includes data for a picture of a base layer but not data for a picture of an enhancement layer. In general, the POC value reset may include determining a value for an anchor POC value for the POC resetting period and adjusting POC values of pictures in the same layer and that are currently stored in a decoded picture buffer (DPB), based at least in part on the anchor POC value. In this manner, even when the actual anchor POC value cannot be determined (e.g., due to loss or other errors), POC values for the POC resetting period can be determined and properly refer to POC values of previously decoded pictures in the DPB, which may be used as reference pictures for decoding subsequent pictures. POC resetting may include only resetting most significant bits (MSB) of a POC value or a full reset (including resetting both MSB and least significant bits (LSB)) of the POC value.

The techniques of this disclosure may also support techniques in which an access unit (that is, a unit of data including all network abstraction layer (NAL) units for a particular time instance) includes data for one layer but does not include data for another layer. For example, different layers of video data may have different frame rates, e.g., for purposes of temporal scalability. The picture of the layer for which the access unit has data may be an intra-random access point (IRAP) picture, and therefore, serve as a POC anchor picture for that layer. Typically, it is desirable for POC values to be aligned between layers. Therefore, the techniques of this disclosure may be used to retain an alignment of POC values between video coding layers, even if pictures are not provided for each time instance at each layer.

For example, video coders may be configured to perform a POC reset at most once per POC resetting period. Multiple pictures may belong to the same POC resetting period. Furthermore, multiple pictures may indicate that POC values are to be reset during the POC resetting period. However, rather than resetting POC values in response to each picture indicating that POC values are to be reset, a video coder may be configured to determine whether POC values have been reset during the POC resetting period (e.g., as a result of a previous picture of the POC resetting period indicating that POC values are to be reset). Then, the video coder may reset the POC values only if the POC values have not yet been reset for the corresponding POC resetting period.

Furthermore, video coders may be configured to code a POC LSB value in a slice segment header. A video coder may use such a POC LSB value when updating POC values of pictures in the same layer as the slice in a decoded picture buffer (DPB) and for derivation of a POC MSB value of the current picture. A POC anchor picture may have a POC resetting type value that indicates either that the POC value for the POC anchor picture is to be fully reset or only the MSB of the POC value of the POC anchor picture are to be reset. The video coder may set the LSB POC value of the POC anchor picture equal to the POC LSB value signaled in the slice segment header. The POC anchor picture may correspond to the first picture of the POC resetting period including the slice. The video coder may also decrement POC values of other pictures in the DPB by the POC LSB value.

A video coder may also be configured to code a two-bit indication (e.g., a value for a poc_reset_idc syntax element) in a slice segment header to indicate a POC resetting type for the picture including the slice. The indication may indicate that the POC resetting type is no POC reset, reset only MSB values of the POC value, reset both MSB and LSB values of the POC value (also referred to as full resetting), or that additional information is signaled to indicate a type of resetting, where the additional information may indicate whether full resetting or only MSB resetting is to be performed, as well as a POC LSB value, as discussed above. Video coders may be configured with the restriction that POC anchor pictures (those at the beginning of a POC resetting period) must have a POC resetting type indicating full resetting, MSB resetting, or that additional information is signaled. Video coders may code multiple pictures of the same POC resetting period having a POC resetting type indicating that additional information is signaled, which may improve error resiliency or provide support for missing-collocated-picture scenarios. In this manner, video coders may be configured to perform a POC reset (e.g., either full resetting or MSB-only resetting) based on a POC resetting type (e.g., a value of a syntax element representative of the POC resetting type).

Furthermore, video coders may be configured to code an indication in a parameter set, such as a PPS or SPS, indicating whether POC resetting information is signaled in corresponding slice segment headers. For example, a PPS may include such an indication when the slice_segment_header_extension_present_flag syntax element in the PPS is equal to 1, the value of the indication may indicate whether slice segment headers will include POC resetting information (e.g., a POC resetting period identifier and/or a POC resetting type indicator).

FIG. 1 is a block diagram illustrating an example video encoding and decoding system 10 that may utilize techniques for coding POC value information according to the techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding POC value information according to the techniques of this disclosure. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for coding POC value information according to the techniques of this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 respectively may operate according to a video coding standard, such as the High Efficiency Video Coding (HEVC) standard presently under development, and may conform to the HEVC Test Model (HM). Alternatively, video encoder 20 and video decoder 30 respectively may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 respectively may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC was working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

Motion information for an inter-predicted PU (more particularly, an inter-predicted portion of a CU to which a PU corresponds) may include a reference picture list identifier and a reference index corresponding to a position of a reference picture in the reference picture list. Video encoder 20, for example, may construct the reference picture list (including any modifications made to an originally-constructed reference picture list), and perform a motion search among the reference pictures in the reference picture list to identify a closely matching block (e.g., based on sum of absolute difference (SAD) metrics, or similar metrics), also referred to as a reference block. In order to signal the location of the reference block, video encoder 20 may encode the reference picture list identifier and the reference index for the PU. Furthermore, video encoder 20 may encode data representative of reference pictures to be included in the reference picture list, e.g., by signaling data representative of POC values for the reference pictures in a slice header and/or in a parameter set, such as a picture parameter set or a sequence parameter set.

Video encoder 20 and video decoder 30 may generally be configured to operate according to a video coding standard or an extension to a video coding standard, such as MV-HEVC or SHVC. For purposes of example, techniques of this disclosure are described below with respect to MV-HEVC, but it should be understood that these techniques may be applied to other video coding standards or extensions, such as SHVC.

A POC resetting period may be defined as follows, e.g., in subclause F.3 of MV-HEVC:

F.3.1 picture order count (POC) resetting period: A sequence of pictures in decoding order within a layer that all have poc_reset_idc greater than 0 and the same value of poc_reset_period_id.

Alternatively, the phrase "within a layer" in the definition above may be omitted, e.g., as follows:

F.3.2 picture order count (POC) resetting period: A sequence of pictures in decoding order that all have poc_reset_idc greater than 0 and the same value of poc_reset_period_id.

In one example, MV-HEVC (or another applicable standard or standard extension) may require that pictures in a POC resetting period be continuous in decoding order within a layer. However, allowing these pictures to be interleaved with pictures with poc_reset_idc equal to 0 in the same layer may add flexibility and allow use of the same overhead to achieve better error resilience for clustered packet losses.

Video encoder 20 may assign slices to respective POC resetting periods. Each POC resetting period may include one or more slices. Thus, when POC values are reset for a POC resetting period (including resetting POC values of reference pictures preceding the POC resetting period in coding order), video encoder 20 may signal POC values of reference pictures to be included in a reference picture list based on the reset POC values.

In general, when performing a POC reset, video encoder 20 and video decoder 30 respectively reset the POC value of a POC anchor picture and other pictures currently stored in a decoded picture buffer (DPB). Then, video encoder 20 and video decoder 30 respectively may determine POC values for other pictures in the POC resetting period based on the reset POC value of the POC anchor picture. In some examples, video encoder 20 and video decoder 30 respectively may perform the POC reset for the POC anchor picture, that is, during coding of the POC anchor picture.

In accordance with the techniques of this disclosure, a layer-specific POC resetting period may be specified based on a POC resetting period identifier signaled in slice segment headers. That is, video encoder 20 and video decoder 30 respectively may code data representative of the POC resetting period identifier in slice segment headers. Each non-IRAP picture that belongs to an access unit that contains at least one IRAP picture may be the start of a POC resetting period in the layer containing the non-IRAP picture. That is, video encoder 20 may set a POC resetting type for a non-IRAP picture of an access unit containing at least one IRAP picture to indicate that the non-IRAP picture is the start of a new POC resetting period. Furthermore, video encoder 20 may perform a POC reset based on the POC resetting type. In such an access unit, each picture would be the start of a POC resetting period in the layer containing the picture. POC resetting, either POC MSB only or both POC MSB and POC LSB, and update of POC values of same-layer pictures in the DPB may be applied only for the first picture within each POC resetting period.

Video encoder 20 may signal a POC LSB value in a slice segment header that video decoder 30 may use to derive POC values of pictures in a layer including the slice having the slice segment header. The POC LSB value signaled in the slice segment header may be used for derivation of the delta POC value, which is used for updating the POC values of the same-layer pictures in the DPB, and also for derivation of the POC MSB of the POC value of the current picture. When the current picture has such a POC LSB value signaled, and when the POC-anchor picture associated with the current picture is present in the bitstream, the POC-anchor picture has an indication of either full POC resetting or POC MSB resetting. Such a POC LSB value signaled for the current picture is equal to the POC LSB value of the POC-anchor picture, which is also the first picture of the POC resetting period as the current picture.

Video encoder 20 and video decoder 30 respectively may code a two-bit indication syntax element of a slice segment header indicating a type of POC resetting for a slice having the slice segment header. Video encoder 20 and video decoder 30 respectively may code a value of 0 for this indication for pictures with no POC value or POC MSB value resetting. Video encoder 20 and video decoder 30 respectively may code a value of 1 for this indication for pictures with only POC MSB resetting. Video encoder 20 and video decoder 30 respectively may code a value of 2 for this indication for pictures with full POC resetting. Video encoder 20 and video decoder 30 respectively may code a value of 3 for this indication for pictures with either full POC resetting or POC MSB resetting and with additional information signaled. Video encoder 20 and video decoder 30 respectively may be configured with a restriction that a picture with a value 1 or 2 of the two-bit indication must be the start of a POC resetting period. Alternatively, in some examples, a picture with a value 3 for the two-bit indication can also be the start of a POC resetting period. Video encoder 20 and video decoder 30 respectively may be configured with a restriction that a picture that belongs to a POC resetting period but that is not the first picture in the POC resetting period must have value 3 for the two-bit indication.

Use cases in which one access unit includes an IRAP picture in one layer but no picture at all for another layer are supported through a picture with a value 3 for the two-bit indication being the start of a POC resetting period. In other words, by providing additional signaling information as indicated by a value of 3 for the two-bit indication, video encoder 20 and video decoder 30 respectively may code video data including at least one access unit having an IRAP picture in one layer and no picture in another layer.

The techniques of this disclosure may enhance error resiliency. For example, a loss of a picture at the start of a POC resetting period can be overcome by having one or more same-layer pictures that follow that picture in decoding order and that are assigned a value 3 for the two-bit indication. The additional information may include a POC LSB value for the POC anchor picture starting the POC resetting period. Thus, the same process for support of missing-collocated-picture scenarios may be applied to resolve the error resilience issue.

The following table is an example of syntax for a slice segment header in accordance with the techniques of this disclosure. The slice syntax header may be modified relative to, e.g., that of MV-HEVC. In the example syntax table and semantics below, additions to MV-HEVC are represented using italics and deletions from MV-HEVC are represented using bracketed text preceded by "removed" (e.g., [removed: "removed text"]). Moreover, statements regarding "requirements" should be understood to form part of the text of the standard or standard extension, and not a requirement for purposes of the techniques of this disclosure.

| slice_segment_header( ) { | Descriptor |
|---|---|
| ... | |
| if( !dependent_slice_segment_flag ) { | |
|   i = 0 | |
|   if( num_extra_slice_header_bits > i ) { | |
|     i++ | |
|     discardable_flag | u(1) |
|   } | |
|   if( num_extra_slice_header_bits > i ) { | |
|     i++ | |
|     cross_layer_bla_flag | u(1) |
|   } | |
|   [removed:"if( num_extra_slice_header_bits > i ) { | |
|     i++ | |
|     poc_reset_eflag | u(1) |
|   }"] | |
|   ... | |
|   if( slice_segment_header_extension_present_flag ) { | |
|     slice_segment_header_extension_length | ue(v) |
|     *if( poc_reset info_present_flag )* | |
|       *poc_reset_idc* | *u(2)* |
|     *if( poc_reset_idc != 0 )* | |
|       *poc_reset_period_id* | *u(6)* |
|     *if( poc_reset_idc == 3 ) {* | |
|       *full_poc_reset_flag* | *u(1)* |
|       *poc_lsb_val* | *u(v)* |
|     *}* | |
|     *if( ( poc_reset_info_present_flag && poc_reset_idc == 0 ) \|\|* | |
|       *( poc_reset_idc == 3 &&* | |
|         *( log2_max_pic_order_cnt_lsb_minus4 + 5 ) % 8 != 0 ) )* | |
|       slice_segment_header_extension_reserved_bits | u(v) |
|     for( i = BytesInSliceSegmtHdrExt; i < slice_segment_header_extension_length; i++) | |
|       slice_segment_header_extension_data_byte[ i ] | u(8) |
|   } | |
|   byte_alignment( ) | |
| } | |

Alternatively, poc_reset_period_id may be signaled using a different number of bits, e.g. coded as u(14).

When present, the value of the slice segment header syntax elements slice_pic_parameter_set_id, pic_output_flag, no_output_of_prior_pics_flag, slice_pic_order_cnt_lsb, short_term_ref_pic_set_sps_flag, short_term_ref_pic_set_idx, num_long_term_sps, num_long_term_pics, slice_temporal_mvp_enabled_flag, discardable_flag, cross_layer_bla_flag, inter_layer_pred_enabled_flag, num_inter_layer_ref_pics_minus1, poc_reset_idc, poc_reset_period_id, full_poc_reset_flag, and poc_lsb_val shall be the same in all slice segment headers of a coded picture. When present, the value of the slice segment header syntax elements lt_idx_sps[i], poc_lsb_lt[i], used_by_curr_pic_lt_flag[i], delta_poc_msb_present_flag[i], delta_poc_msb_cycle_lt[i], and inter_layer_pred_layer_idc[i] shall be the same in all slice segment headers of a coded picture for each possible value of i.

[removed: "poc_reset_flag equal to 1 specifies that the derived picture order count for the current picture is equal to 0. poc_reset_flag equal to 0 specifies that the derived picture order count for the current picture may or may not be equal to 0. When not present, the value of poc_reset_flag is inferred to be equal to 0.

NOTE—When poc_reset_flag is equal to 1 in a base-layer picture, PicOrderCntVal is derived differently depending on whether the decoding process of subclause 8.3.1 or subclause F.8.3.1 is applied. Furthermore, when a base-layer picture with poc_reset_flag equal to 1 is prevTid0Pic according to subclause 8.3.1 or F.8.3.1, the variable prevPicOrderCntLsb is derived differently in subclauses 8.3.1 and F.8.3.1. In order to avoid PicOrderCntMsb to be updated incorrectly in one of the subclauses 8.3.1 or F.8.3.1, when prevTid0Pic is a base-layer picture with poc_reset_flag equal to 1 and either of the following conditions is true for prevPicOrderCntLsb derived with one of the subclauses 8.3.1 or F.8.3.1, the value of pie order_cnt_lsb of prevTid0Pic shall be such that the same condition is true also for prevPicOrderCntLsb derived with the other one of the subclauses 8.3.1 or F.8.3.1:
(slice_pic_order_cnt_lsb<prevPicOrderCntLsb) && ((prevPicOrderCntLsb—slice_pic_order_cnt_lsb)>=(MaxPicOrderCntLsb/2))
(slice_pic_order_cnt_lsb>prevPicOrderCntLsb) && ((slice_pic_order_cnt_lsb—prevPicOrderCntLsb)>(MaxPicOrderCntLsb/2))"].

slice_segment_header_extension_length specifies the length of the slice segment header extension data in bytes, not including the bits used for signalling slice_segment_header_extension_length itself. If poc_reset_info_present_flag is equal to 0, the value of slice_segment_header_extension_length shall be in the range of 0 to 256, inclusive. Otherwise, the value of slice_segment_header_extension_length shall be in the range of 1 to 256, inclusive, when poc_reset_idc is less than 3, and in the range of 1+Ceil((log 2_max_pic_order_cnt_lsb_minus4+5)/8) to 256, inclusive, when poc_reset_idc is equal to 3.

poc_reset_idc equal to 0 specifies that neither the most significant bits nor the least significant bits of the picture order count value for the current picture are reset. poc_reset_idc equal to 1 specifies that only the most significant bits of the picture order count value for the current picture may be reset. poc_reset_idc_equal to 2 specifies that both the most significant bits and the least significant bits of the picture order count value for the current picture may be reset. poc_reset_idc equal to 3 specifies that either only the most significant bits or both the most significant bits and the least significant bits of the picture order count value for the current picture may be reset and additional picture order count information is signaled. When not present, the value of poc_reset_poc is inferred to be equal to 0.

It is a requirement of bitstream conformance that the following constraints apply:
The value of poc_reset_idc shall not be equal to 1 or 2 for a RASL picture, a RADL picture, a sub-layer non-reference picture, or a picture that has TemporalId greater than 0.
When the value of poc_reset_idc of a picture in an access unit is equal to 1, the value of poc_reset_idc of all pictures in the access unit shall be equal to 1. (Alternatively, this element may be written: When present, the value of poc_reset_idc of all pictures in an access unit shall be the same.)
When the value of poc_reset_idc of a picture in an access unit is equal to 2, the value of poc_reset_idc of all pictures in the access unit shall be equal to 2. (Alternatively, this element may be omitted in its entirety)
When one picture in an access unit is an IRAP picture with a particular value of nal_unit_type and there is at least one other picture in the same access unit with a different value of nal_unit_type, the value of poc_reset_idc shall be equal to 1 or 2 for all pictures in the access unit. When the picture with nuh_layer_id equal to 0 in an access unit is an IDR picture and there is at least one non-IDR picture in the same access unit, the value of poc_reset_idc shall be equal to 1 for all pictures in the access unit.
When the picture with nuh_layer_id equal to 0 in an access unit is not an IDR picture, the value of poc_reset_idc shall not be equal to 1 for any picture in the access unit.

poc_reset_period_id identifies a POC resetting period. There shall be no two pictures consecutive in decoding order in the same layer that have the same value of poc_reset_period_id and poc_reset_idc equal to 1 or 2.

NOTE—It is not prohibited for multiple pictures in a layer to have the same value of poc_reset_period_id and to have poc_reset_idc equal to 1 or 2 unless such pictures occur in two consecutive access units in decoding order. To minimize the likelihood of such two pictures appearing in the bitstream due to picture losses, bitstream extraction, seeking, or splicing operations, encoders should set the value of poc_reset_period_id to be a random value for each POC resetting period (subject to the constraints specified above).

In some examples, the following may additionally be inserted following the "NOTE" above:
It is a requirement of bitstream conformance that the following constraints apply:
When pictures with poc_reset_idc equal to 1 and 3 are present in the same POC resetting period, all pictures with poc_reset_idc equal 3 in that POC resetting period shall follow the picture with poc_reset_idc equal to 1 in decoding order.
When pictures with poc_reset_idc equal to 2 and 3 are present in the same POC resetting period, all pictures with poc_reset_idc equal 3 in that POC resetting period shall follow the picture with poc_reset_idc equal to 2 in decoding order.

full_poc_reset_flag equal to 1 specifies that both the most significant bits and the least significant bits of the picture order count value for the current picture are reset when the previous picture in decoding order in the same layer does not belong to the same POC resetting period. full_poc_reset_flag equal to 0 specifies that only the most significant bits of the picture order count value for the current picture are reset when the previous picture in decoding order in the same layer does not belong to the same POC resetting period.

poc_lsb_val specifies a value that may be used to derive the picture order count of the current picture. The length of the poc_lsb_val syntax element is log 2_max_pic_order_cnt_lsb_minus4+4 bits.

It is a requirement of bitstream conformance that, when poc_reset_idc is equal to 3, and the previous picture picA in decoding order that is in the same layer as the current picture, has poc_reset_idc equal to 1 or 2, and belongs to the same POC resetting period is present in the bitstream, picA shall be the same picture as the previous picture in decoding order that is in the same layer as the current picture, that is not a RASL picture, a RADL picture or a sub-layer non-reference picture, and that has TemporalId equal to 0, and the value of poc_lsb_val of the current picture shall be equal to the value of slice_pic_order_cnt_lsb of picA.

The variables numRsvBits and BytesInSliceSegmtHdrExt are derived as follows:

```
if( !poc_reset_info_present_flag ) {
    numRsvBits = 0
    BytesInSliceSegmtHdrExt = 0
} else if( poc_reset_idc = = 0 ) {
    numRsvBits = 6
    BytesInSliceSegmtHdrExt = 1
}
else if( poc_reset_idc < 3 ) {
    numRsvBits = 0
    BytesInSliceSegmtHdrExt = 1
}
else {
    numRsvBits = 8 − ( log2_max_pic_order_cnt_lsb_minus4 + 5 )
        % 8
    bitsInSliceSegmtHdrExt = 1 + Ceil( (
        log2_max_pic_order_cnt_lsb_minus4 + 5 ) / 8 )
}
``` slice_segment_header_extension_reserved_bits may have any value. The length of the slice_segment_header_extension_reserved_bits syntax element is equal to numRsvBits bits. Decoders shall ignore the value of slice_segment_header_extension_reserved_bits. Its value does not affect decoder conformance to profiles specified in this version of this Specification.

Video decoder 30 may perform the following decoding process for starting the decoding of the first picture in an access unit:
  The value of PocResetFlag is set to 0.
  The variable DeltaPocVal is set to 0.
  The variable UpdateSubDpbFlag[i] is set equal to 0 for all values of i from 0 to 63, inclusive.

Video decoder 30 may perform the following decoding process for ending the decoding of the last picture in an access unit:
  If PocResetFlag is equal to 1, the following applies:
    For all values of i from 0 to 63, inclusive, if UpdateSubDpbFlag[i] is equal to 0 the PicOrderCntVal of each picture that is in the DPB and has nuh_layer_id equal to i is decremented by DeltaPocVal.

Video encoder 20 and video decoder 30 respectively may code an indication included in the PPS for controlling the presence of POC resetting information in slice segment headers for slices of pictures that correspond to the PPS. For example, the PPS may include a slice_segment_header_extension_present_flag syntax element. POC resetting information may be present in slices of pictures corresponding to the PPS under the condition slice_segment_header_extension_present_flag being equal to 1. In general, a picture may be said to correspond to a PPS when a slice of the picture includes a PPS identifier syntax element having a value equal to a value for an identifier of the PPS.

The following table provides one example of syntax for the PPS. This example represents modified syntax for the PPS to perform the techniques of this disclosure. Added subject matter relative to MV-HEVC is shown in italics in the table and in the semantics for syntax elements of the PPS. Accordingly, video encoder 20 and video decoder 30 respectively may code PPSs according to the following syntax and semantics:

| pic_parameter_set_rbsp( ) { | Descriptor |
|---|---|
| ... | |
| pps_extension_flag | u(1) |
| if( pps_extension_flag ) { | |
| *poc_reset_info_present_flag* | *u(1)* |
| *pps_extension2_flag* | *u(1)* |
| *if( pps_extension2_flag )* | |
| while( more_rbsp_data( ) ) | |
| pps_extension_data_flag | u(1) |
| } | |
| rbsp_trailing_bits( ) | |
| } | | pps_extension_flag equal to 0 specifies that no pps_extension_data_flag syntax elements are present in the PPS RBSP syntax structure. When slice_segment_header_extension_present_flag is equal to 0, pps_extension_flag shall be equal to 0 in bitstreams conforming to this version of this Specification, the value of 1 for pps_extension_flag is reserved for future use by ITU-T|ISO/IEC, and decoders shall ignore all data that follow the value 1 for pps_extension_flag in a PPS NAL unit.

poc_reset_info_present_flag equal to 0 specifies that the syntax element poc_reset_idc is not present in the slice segment headers of the slices referring to the PPS. poc_reset_info_present_flag equal to 1 specifies that the syntax element poc_reset_idc is present in the slice segment headers of the slices referring to the PPS.

pps_extension2_flag equal to 0 specifies that no pps_extension_data_flag syntax elements are present in the PPS RBSP syntax structure. pps_extension2_flag shall be equal to 0 in bitstreams conforming to this version of this Specification. The value of 1 for pps_extension2_flag is reserved for future use by ITU-T\ISO/IEC. Decoders shall ignore all data that follow the value 1 for pps_extension2_flag in a PPS NAL unit.

The following definition of a mathematical function may be added to MV-HEVC, e.g., to subclause 5.8 of MV-HEVC:

$$GetCurrMsb(cl, pl, pm, ml) = \begin{cases} pm + ml; & pl - cl >= ml/2 \\ pm - ml; & cl - pl > ml/2 \\ pm; & \text{otherwise} \end{cases}$$

Video decoder 30 may perform the following decoding process for POC values. This process is may be described in a modified version of MV-HEVC or other extension to a video coding standard. Changes are shown below relative to MV-HEVC, where italicized text represents additions and deletions are shown using [removed: " "].

Output of this process is PicOrderCntVal, the picture order count of the current picture. Picture order counts are used to identify pictures, for deriving motion parameters in merge mode and motion vector prediction, and for decoder conformance checking (see subclause C.5 of MV-HEVC). Each coded picture is associated with a picture order count variable, denoted as PicOrderCntVal.

[removed: "If FirstPicInLayerDecodedFlag[nuh_layer_id] is equal to 0 or the current picture is an IRAP picture with NoRaslOutputFlag equal to 1, the variable PicOrderCntMsb is set equal to 0. [Ed. (MH): When the first picture in an enhancement layer is in an access unit which follows in decoding order and precedes in output order an initial IRAP access unit with NoClrasOutputFlag equal to 1, PicOrderCntVal of the first picture in the enhancement layer differs from the PicOrderCntVal of the base-layer picture in the same access unit.] [Ed. (MH): This derivation of PicOrderCntMsb equal to 0 imposes a constraint that the layer-wise start-up up to the highest layer must take place within a POC range of 0 to MaxPicOrder Lsb−1, inclusive.] Otherwise, PicOrderCntMsb is derived as follows:

```
The variable prevPicOrderCntLsb is set equal to
PrevPicOrderCnt[ nuh_layer_id
] & ( MaxPicOrderCntLsb − 1 ).
The variable prevPicOrderCntMsb is set equal to PrevPicOrderCnt[
nuh_layer_id ] − prevPicOrderCntLsb.
```

PicOrderCntMsb is derived as follows:

```
if( ( slice_pic_order_cnt_lsb < prevPicOrderCntLsb ) &&
    ( ( prevPicOrderCntLsb − slice_pic_order_cnt_lsb ) >= (
    MaxPicOrderCntLsb / 2 ) ) )
    PicOrderCntMsb =                                          (F-23)
    prevPicOrderCntMsb + MaxPicOrderCntLsb
else if( (slice_pic_order_cnt_lsb > prevPicOrderCntLsb ) &&
    ( (slice_pic_order_cnt_lsb − prevPicOrderCntLsb ) > (
    MaxPicOrderCntLsb / 2 ) ) )
    PicOrderCntMsb = prevPicOrderCntMsb − MaxPicOrderCntLsb
else
    PicOrderCntMsb = prevPicOrderCntMsb
PicOrderCntVal is derived as follows:
    PicOrderCntVal = PicOrderCntMsb +                         (F-24)
    slice_pic_order_cnt_lsb
```

When poc_reset_flag is equal to 1, the following steps apply in the order listed:
  The PicOrderCntVal of each picture that is in the DPB and belongs to the same layer as the current picture is decremented by PicOrderCntVal.
  PrevPicOrderCnt[nuh_layer_id] is decremented by PicOrderCntVal.
  PicOrderCntVal is set equal to 0.
  When the current picture is not a RASL picture, a RADL picture or a sub-layer non-reference picture, and the current picture has TemporalId equal to 0, PrevPicOrderCnt[nuh_layer_id] is set equal to PicOrderCntVal".

If FirstPicInLayerDecodedFlag[nuh_layer_id] is equal to 1, poc_reset_idc is greater than 0, and the current picture is the first picture in decoding order in a POC resetting period, the following applies: (Alternatively, this element may be written as: If FirstPicInLayerDecodedFlag[nuh_layer_id] is equal to 1 and, poc_reset_idc is greater than 0, or, FirstPicInLayerDecodedFlag[nuh_layer_id] is equal to 1 and poc_reset_idc is equal to 3 and the current picture is contained in the first picture access unit in decoding order in a POC resetting period and there is no picture with poc_reset_idc equals to 1 or 2 in that POC resetting period, the following applies:)
  The variables pocMsbDelta and pocLsbDelta are derived as follows:

```
prevPicOrderCntLsb = PrevPicOrderCnt[ nuh_layer_id ] & (
    MaxPicOrderCntLsb − 1 )
prevPicOrderCntMsb = PrevPicOrderCnt[ nuh_layer_id ] −
    prevPicOrderCntLsb
if( poc_reset_idc == 3 )
    pocLsbVal = poc_lsb_val
else
    pocLsbVal = slice_pic_order_cnt_lsb
pocMsbDelta = getCurrMsb( pocLsbVal, prevPicOrderCntLsb,
    prevPicOrderCntMsb, MaxPicOrderCntLsb )
if( poc_reset_idc == 2 || ( poc_reset_idc == 3 &&
    full_poc_reset_flag ) )
    pocLsbDelta = pocLsbVal
else
    pocLsbDelta = 0
```

The PicOrderCntVal of each picture that is in the DPB and belongs to the same layer as the current picture is decremented by pocMsbDelta+pocLsbDelta.
  In some examples, the following three steps may additionally be performed:

```
PocResetFlag = 1
DeltaPocVal = pocMsbDelta + pocLsbDelta
UpdateSubDpbFlag[ nuh_layer_id ] = 1
```

The PicOrderCntVal of the current picture is derived as follows:

```
if( poc_reset_idc == 1 )
    PicOrderCntVal = slice_pic_order_cnt_lsb
else if( poc_reset_idc == 2 )
    PicOrderCntVal = 0
else { // poc_reset_idc == 3
    PicOrderCntMsb = getCurrMsb(slice_pic_order_cnt_lsb,
    poc_lsb_val, 0, MaxPicOrderCntLsb )
    PicOrderCntVal = PicOrderCntMsb + slice_pic_order_cnt_lsb
}
```

The value of PrevPicOrderCnt[nuh_layer_id] is derived as follows:
    If the current picture is not a RASL picture, a RADL picture, or a sub-layer non-reference picture, and the current picture has TemporalId equal to 0, PrevPicOrderCnt[nuh_layer_id] is set equal to PicOrderCntVal.
    Otherwise when poc_reset_idc is equal to 3, PrevPicOrderCnt[nuh_layer_id] is set equal to full_poc_reset_flag? 0:poc_lsb_val.
    Otherwise, the following applies:
    The PicOrderCntVal of the current picture is derived as follows:

```
if( !FirstPicInLayerDecodedFlag[ nuh_layer_id ] ) {
    if( poc_reset_idc == 1 )
        PicOrderCntVal = slice_pic_order_cnt_lsb
    else if( poc_reset_idc == 2 )
        PicOrderCntVal = 0
    else if( poc_reset_idc == 3 ) {
        PicOrderCntMsb = getCurrMsb(slice_pic_order_cnt_lsb,
        poc_lsb_val, 0, MaxPicOrderCntLsb )
        PicOrderCntVal = PicOrderCntMsb +
        slice_pic_order_cnt_lsb
```

-continued

```
    } else // the current picture is an IRAP picture with
NoRaslOutputFlag equal to 1
        PicOrderCntVal = slice_pic_order_cnt_lsb
} else { // the POC derivation as in HEVC version 1
    if( the current picture is an IRAP picture with NoRaslOutputFlag
    equal to 1 )
        PicOrderCntMsb = 0
    else {
        prevPicOrderCntLsb = PrevPicOrderCnt[ nuh_layer_id ]
            & ( MaxPicOrderCntLsb − 1 )
        prevPicOrderCntMsb = PrevPicOrderCnt[ nuh_layer_id
            ] − prevPicOrderCntLsb
        PicOrderCntMsb = getCurrMsb( slice_pic_order_cnt_lsb,
            prevPicOrderCntLsb, prevPicOrderCntMsb,
            MaxPicOrderCntLsb )
    }
    PicOrderCntVal = PicOrderCntMsb + slice_pic_order_cnt_lsb
}
```

The value of PrevPicOrderCnt[nuh_layer_id] is derived as follows:

If the current picture is not a RASL picture, a RADL picture, or a sub-layer non-reference picture, and the current picture has TemporalId equal to 0, PrevPicOrderCnt[nuh_layer_id] is set equal to PicOrderCntVal.

Otherwise when FirstPicInLayerDecodedFlag[nuh_layer_id] is equal to 0 and poc_reset_idc is equal to 3, PrevPicOrderCnt[nuh_layer_id] is set equal to full_poc_reset_flag? 0: poc_lsb_val.

According to MV-HEVC, the value of PicOrderCntVal shall be in the range of −231 to 231−1, inclusive. Likewise according to MV-HEVC, in one CVS, the PicOrderCntVal values for any two coded pictures in the same layer shall not be the same.

The function PicOrderCnt(picX) is specified as follows:

PicOrderCnt(picX)=PicOrderCntVal of the picture picX    (F-25)

The function DiffPicOrderCnt(picA, picB) is specified as follows:

DiffPicOrderCnt(picA,picB)=PicOrderCnt(picA)−PicOrderCnt(picB)    (F-26)

According to MV-HEVC, the bitstream shall not contain data that result in values of DiffPicOrderCnt(picA, picB) used in the decoding process that are not in the range of −215 to 215−1, inclusive.

NOTE—Let X be the current picture and Y and Z be two other pictures in the same sequence, Y and Z are considered to be in the same output order direction from X when both DiffPicOrderCnt(X, Y) and DiffPicOrderCnt(X, Z) are positive or both are negative.

According to MV-HEVC, the following SEI messages have a POC-dependent persistence scope:

Recovery point SEI message

Progressive refinement segment start SEI message

In some examples, the end of persistence scope of such an SEI message may further be restricted to be earlier than the next picture, in decoding order, that is in the same layer as the picture associated with the SEI message and that updates the picture order count values of pictures in the DPB. Alternatively, it is proposed to further restrict the end of persistence scope of such an SEI message to be earlier than the next picture, in decoding order, that is in the same layer as the picture associated with the SEI message, that has poc_msb_reset_flag equal to 1, and for which the previous picture in decoding order in the same layer has poc_msb_reset_flag equal to 0. In this case, a restriction may be further added such that, when poc_msb_reset_flag is set to 1 for a set of pictures after a picture picA wherein POC MSB reset is actually needed, the set of pictures must be immediately after picA in decoding order and must be contiguous in decoding order.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

In this manner, video encoder 20 and video decoder 30 respectively represent examples of video coders configured to code data representative of a value for a picture order count (POC) resetting period identifier, wherein the data is associated with a coded picture of a layer of video data, and wherein the value of the POC resetting period identifier indicates a POC resetting period including the coded picture, and reset at least part of a POC value for the coded picture and POC values for one or more pictures in the layer that are currently stored in a decoded picture buffer (DPB) of the video decoder.

Figure 2:
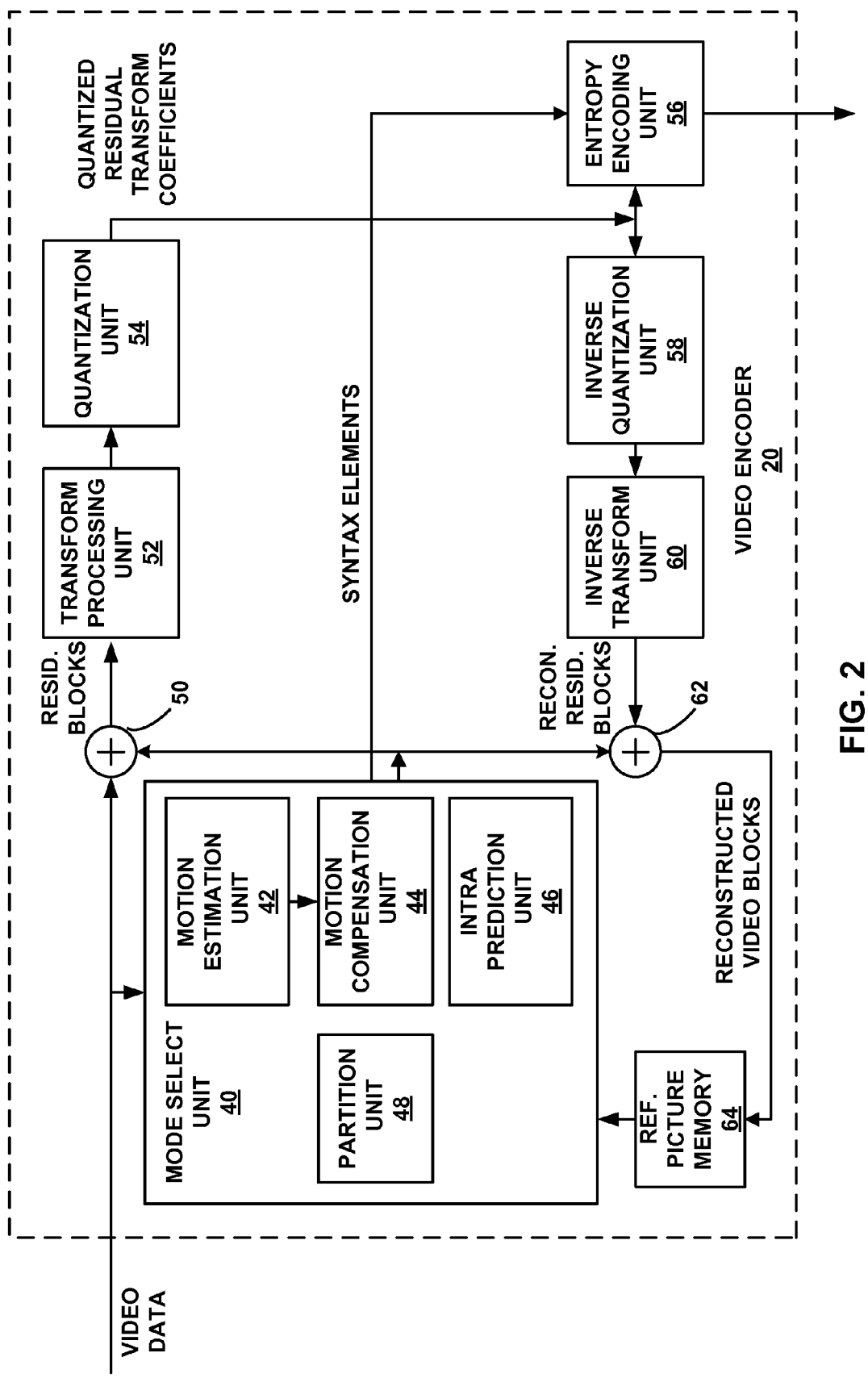
FIG. 2 is a block diagram illustrating an example of a video encoder that may implement techniques for coding POC value information according to the techniques of this disclosure.

FIG. 2 is a block diagram illustrating an example of video encoder 20 that may implement techniques for coding POC value information according to the techniques of this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture (or other coded unit) relative to the current block being encoded within the current slice (or other coded unit). A predictive block is a block that is found to closely match the block to be encoded, in terms of pixel difference, which may be determined by sum of absolute difference (SAD), sum of square difference (SSD), or other difference metrics.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being encoded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Motion estimation unit 42 searches reference pictures stored in a decoded picture buffer (DPB) of reference picture memory 64. Mode select unit 40 may determine which reference pictures are to be used to encode a picture, slice of picture, and/or a sequence of pictures. Video encoder 20 may encode picture order count (POC) values for reference pictures used to encode the picture, slice, or sequence. Video encoder 20 may encode the POC values indicative of the reference pictures to be included in the reference picture list in slice headers and/or parameter sets, such as picture parameter sets (PPSs) and/or sequence parameter sets (SPSs).

In this manner, a video decoder, such as video decoder 30, may reproduce the reference picture list by including the reference pictures indicated in the slice header and/or parameter set(s). Furthermore, after encoding a block using a motion vector produced by motion estimation unit 42, video encoder 20 may encode motion information for the block, where the motion information may include data representative of the motion vector, an identifier for the reference picture list, and a reference index that identifies a reference picture in the reference picture list.

In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

In accordance with the techniques of this disclosure, video encoder 20 may also form POC resetting periods and encode values for POC resetting period identifiers for slices of pictures to assign the slices to respective POC resetting periods. Video encoder 20 may assign slices to POC resetting periods individually within each layer of video data. Moreover, video encoder 20 may determine POC resetting types for the slices and encode values for indications (e.g., two-bit values) of the POC resetting types for the slices.

As discussed with respect to FIG. 1, video encoder 20 may be configured according to restrictions established by an applicable video coding standard. For example, video encoder 20 may ensure that the first picture in each POC resetting period has a POC resetting type indicating that POC values are to be fully or partially reset. Furthermore, video encoder 20 may encode additional information indicative of a POC LSB value in some examples, which may indicate a POC LSB value for a POC anchor picture of the POC resetting period.

Video encoder 20 may also decrement POC values of reference pictures in the DPB of reference picture memory 64 and in the same layer as the slice POC anchor picture, based on the reset of the POC anchor picture. Thus, video encoder 20 may use the decremented POC values when encoding POC values in slice headers and/or parameter sets to indicate reference pictures to be included in a reference picture list. The amount by which video encoder 20 decrements the POC values of pictures in the DPB may be the same amount by which the POC anchor picture is decremented. The POC reset of the POC anchor picture may be limited to only resetting POC MSB or resetting the full POC value of the POC anchor picture.

Prior to encoding the POC resetting information for a slice, video encoder 20 may determine whether the POC resetting information is necessary for the slice. For example, if a picture including the slice is an I-picture, video encoder 20 may determine that the POC resetting information is not necessary. If the POC resetting information is determined not to be necessary, video encoder 20 may avoid encoding the POC resetting information. Furthermore, video encoder 20 may encode a PPS for the picture indicating whether POC resetting information is encoded in slice segment headers of slices included in the picture, based on the determination.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this manner, video encoder 20 of FIG. 2 represents an example of a video encoder configured to encode data representative of a value for a picture order count (POC) resetting period identifier, wherein the data is associated with a coded picture of a layer of video data, and wherein the value of the POC resetting period identifier indicates a POC resetting period including the coded picture and reset at least part of a POC value for the coded picture and POC values for one or more pictures in the layer that are currently stored in a decoded picture buffer (DPB) of the video decoder.

Video encoder 20 further represents an example of a video encoder configured to construct a reference picture list including one or more reference pictures, encode a block of the slice using one of the reference pictures, encode motion information for the block, wherein the motion information includes an identifier of the reference picture list and a reference index into the reference picture list corresponding to the one of the reference pictures, and encode one or more POC values representative of the reference pictures included in the reference picture list.

Figure 3:
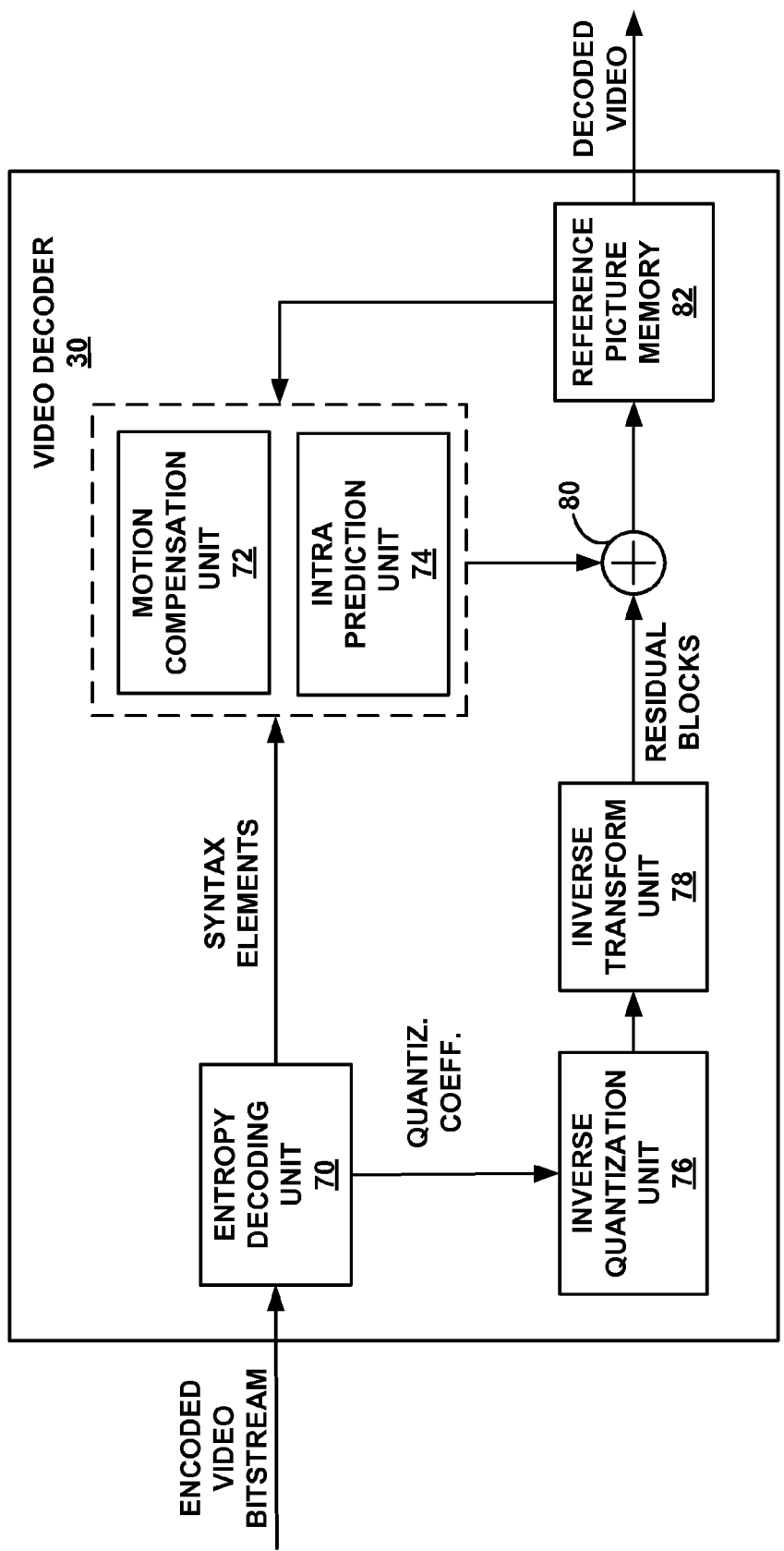
FIG. 3 is a block diagram illustrating an example of a video decoder that may implement techniques for coding POC value information according to the techniques of this disclosure.

FIG. 3 is a block diagram illustrating an example of video decoder 30 that may implement techniques for coding POC value information according to the techniques of this disclosure. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in a decoded picture buffer (DPB) of reference picture memory 82.

More particularly, video decoder 30 may decode a picture parameter set (PPS) containing an indication indicating whether slices of a picture corresponding to the PPS include picture order count (POC) resetting information. Assuming the slices include the POC resetting information, video decoder 30 may decode a slice segment header of a slice of the picture including the POC resetting information. The POC resetting information may include a POC resetting period identifier and a POC resetting type.

The POC resetting period identifier may indicate a POC resetting period to which the slice corresponds. Video decoder 30 may reset POC values of pictures in a corresponding video coding layer once per POC resetting period. In this manner, whether all pictures of the POC resetting period are received properly or some pictures of the POC resetting period are lost (e.g., due to data corruption or data loss), video decoder 30 will reset POC values correctly.

The POC resetting type may indicate whether the POC value of a picture including the slice is fully reset or that only the MSB of the POC value are reset. Furthermore, the POC resetting type may indicate that no POC reset is to be performed or that additional information is signaled. If the POC resetting type indicates that additional information is signaled, video decoder 30 may decode the additional information, which may indicate a POC LSB value and whether the POC value is fully reset or only MSB are reset. In this manner, video decoder 30 may perform a POC reset based on a POC resetting type. Video decoder 30 may decrement POC values for pictures stored in the DPB and in the same layer by the POC LSB value of the additional information.

After performing the POC reset, video decoder 30 may decode POC values of reference pictures to be included in a reference picture list. Video decoder 30 may decode these POC values in the slice segment headers and/or from parameter sets, such as a PPS or an SPS. Video decoder 30 may then construct a reference picture list including the reference pictures identified by the decoded POC values.

After constructing the reference picture list for a slice, video decoder 30 may decode blocks of the slice. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), motion vectors for each inter-encoded video block of the slice, inter-prediction status for each inter-coded video block of the slice, and other information to decode the video blocks in the current video slice. Motion information for an inter-predicted block may include a reference picture list identifier and a reference index to identify a reference picture in the reference picture list to use to predict the block.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 represents an example of a video decoder configured to decode data representative of a value for a picture order count (POC) resetting period identifier, wherein the data is associated with a coded picture of a layer of video data, and wherein the value of the POC resetting period identifier indicates a POC resetting period including the coded picture, and reset at least part of a POC value for the coded picture and POC values for one or more pictures in the layer that are currently stored in a decoded picture buffer (DPB) of the video decoder.

Video decoder 30 further represents an example of a video decoder configured to decode one or more POC values representative of reference pictures to be included in a reference picture list, construct the reference picture list based at least in part on the decoded one or more POC values, decode motion information for a block of the slice, wherein the motion information includes an identifier of the reference picture list and a reference index into the reference picture list, and decode the block using one of the reference pictures corresponding to the reference index in the reference picture list.

Figure 4:
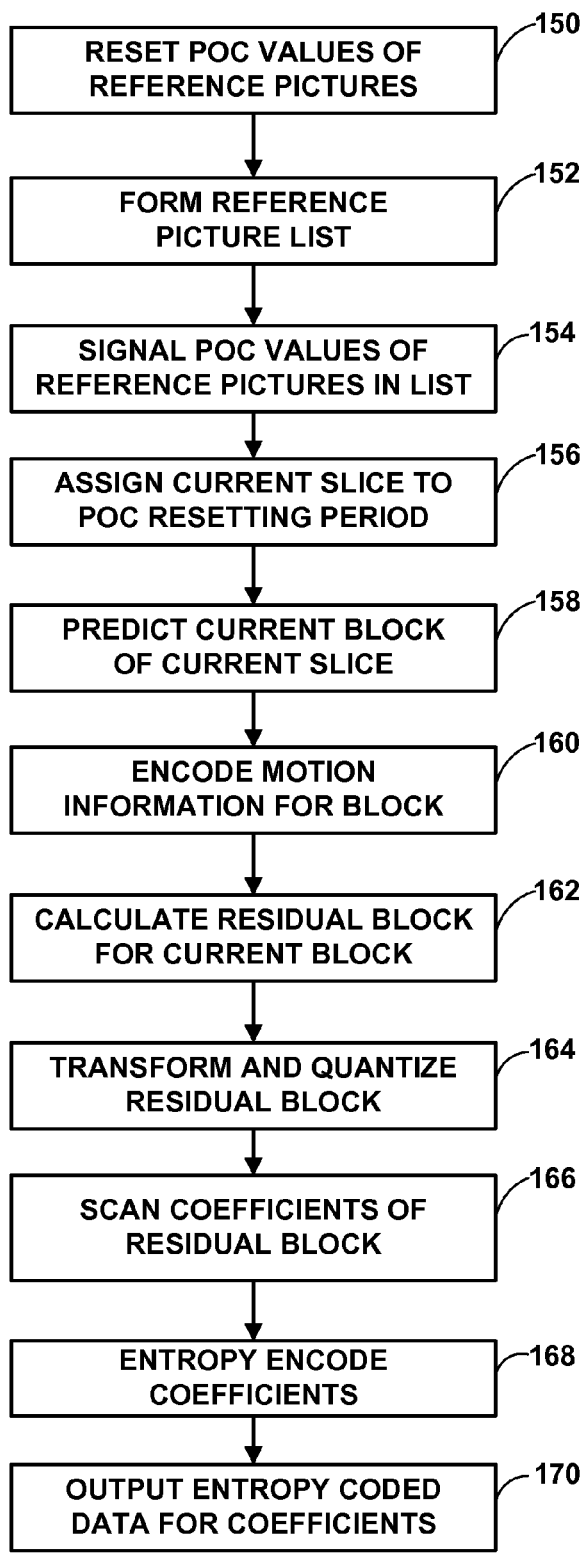
FIG. 4 is a flowchart illustrating an example method for encoding data indicating a POC resetting period for a slice in accordance with the techniques of this disclosure.

FIG. 4 is a flowchart illustrating an example method for encoding data indicating a POC resetting period for a slice in accordance with the techniques of this disclosure. In addition, the method of FIG. 4 includes encoding a current block. The current block may comprise a current CU or a portion of the current CU. Although described with respect to video encoder 20 (FIGS. 1 and 2), it should be understood that other devices may be configured to perform a method similar to that of FIG. 4.

In this example, video encoder 20 initially resets POC values of reference pictures that are in the same layer as a current slice including the current block and that are currently in a decoded picture buffer (DPB) (150). Video encoder 20 then forms a reference picture list including at least some of the reference pictures (152). Video encoder 20 further signals POC values of the reference pictures included in the reference picture list (154). For example, video encoder 20 may encode POC values (or portions of the POC values, e.g., POC LSB values) for the reference pictures in a parameter set such as an SPS or PPS, and/or in a slice header for the slice. Some reference pictures (e.g., long-term reference pictures) may be signaled in the parameter set, whereas other reference pictures (e.g., short-term reference pictures) may be signaled in the slice header.

It should be understood that the steps of forming the reference picture list and signaling which pictures are included in the reference picture list may be performed multiple times over several different encoding passes, in order to determine the set of reference pictures that yields the best rate-distortion characteristics for, e.g., blocks of the current slice. That is, video encoder 20 may select the set of reference pictures included in the reference picture list based on characteristics of all blocks in the current slice, and not just based on the individual characteristics of a single block.

Video encoder 20 may then assign the current slice to a POC resetting period (156). For example, if the current slice forms part of an anchor picture, video encoder 20 may signal that the current slice forms the beginning of a new POC resetting period with a POC resetting period identifier that is different from previous POC resetting period identifiers. Alternatively, if the current slice does not form part of an anchor picture, video encoder 20 may signal that the current slice forms part of an existing POC resetting period.

Video encoder 20 may then predict the current block of the current slice (158). For example, video encoder 20 may calculate one or more prediction units (PUs) for the current block. More particularly, motion estimation unit 42 may perform a motion search for the current block among the reference pictures of the reference picture list to identify a matching block used as a reference block, e.g., based on SAD, SSD, MAD, MSD, or other error calculation metrics. Motion estimation unit 42 may produce a motion vector for the current block based on the motion search Video encoder 20 may then encode motion information for the block (160), which may include motion vector difference values for the motion vector, a reference picture list identifier, and a reference index, which together identify the reference block.

Video encoder 20 may then calculate a residual block for the current block, e.g., to produce a transform unit (TU) (162). To calculate the residual block, video encoder 20 may calculate a difference between the original, uncoded block and the predicted block for the current block. Video encoder 20 may then transform and quantize coefficients of the residual block (164). Next, video encoder 20 may scan the quantized transform coefficients of the residual block (166). During the scan, or following the scan, video encoder 20 may entropy encode the coefficients (168). For example, video encoder 20 may encode the coefficients using CAVLC or CABAC. Video encoder 20 may then output the entropy coded data of the block (170).

In this manner, the method of FIG. 4 represents an example of a method including encoding, by a video encoder, data representative of a value for a picture order count (POC) resetting period identifier, wherein the data is associated with a coded picture of a layer of video data, and wherein the value of the POC resetting period identifier indicates a POC resetting period including the coded picture, and resetting, by the video encoder, at least part of a POC value for the coded picture and POC values for one or more pictures in the layer that are currently stored in a decoded picture buffer (DPB) of the video decoder. The method further includes constructing a reference picture list including one or more reference pictures, encoding a block of the slice using one of the reference pictures, encoding motion information for the block, wherein the motion information includes an identifier of the reference picture list and a reference index into the reference picture list corresponding to the one of the reference pictures, and encoding one or more POC values representative of the reference pictures included in the reference picture list, in this example.

Figure 5:
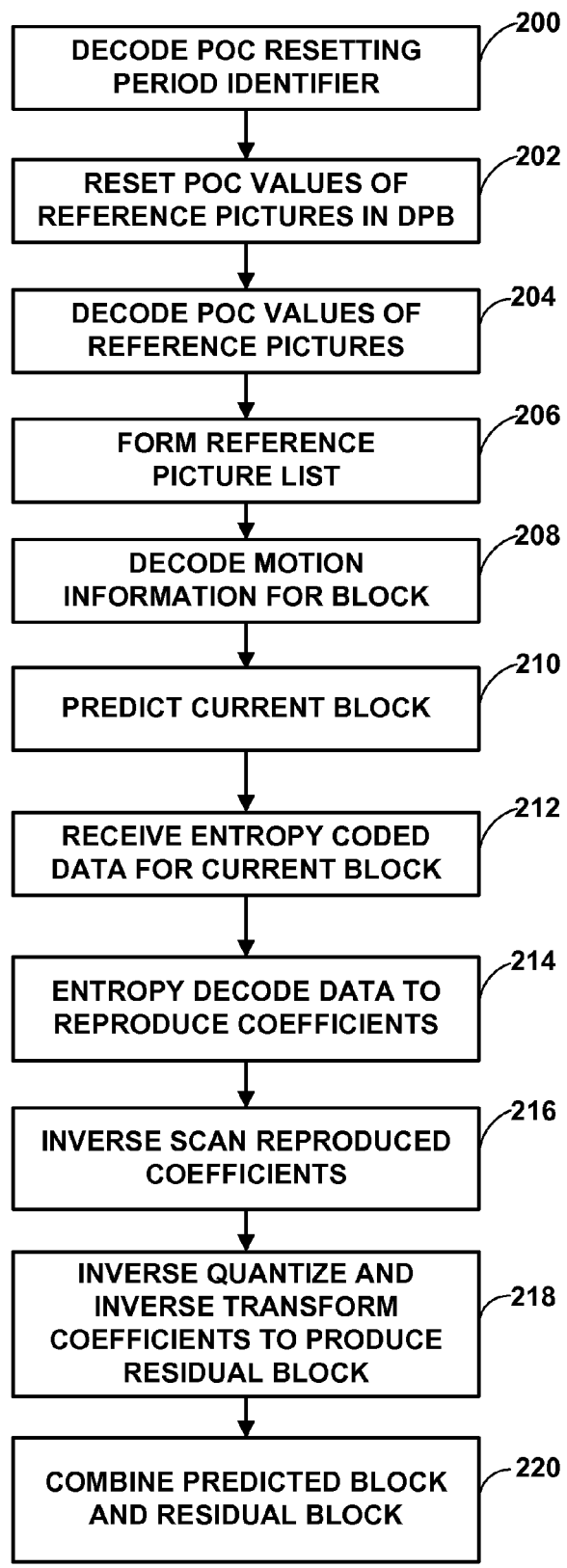
FIG. 5 is a flowchart illustrating an example method for decoding data indicating a POC resetting period for a slice in accordance with the techniques of this disclosure.

FIG. 5 is a flowchart illustrating an example method for decoding data indicating a POC resetting period for a slice in accordance with the techniques of this disclosure. In addition, the method of FIG. 4 includes encoding a current block. The current block may comprise a current CU or a portion of the current CU. Although described with respect to video decoder 30 (FIGS. 1 and 3), it should be understood that other devices may be configured to perform a method similar to that of FIG. 5.

Initially, video decoder 30 decodes a POC resetting period identifier for a current slice (200), e.g., from a slice segment header of the current slice. Video decoder 30 may further decode a POC resetting type indicator. The method of FIG. 5 is based on the assumption that the POC resetting period identifier indicates that the current slice is part of a new POC resetting period. Based on the slice being part of a new POC resetting period, video decoder 30 resets POC values of reference pictures in the DPB (202) that are also part of the same layer as the current slice. Video decoder 30 then decodes POC values of reference pictures to be included in a reference picture list (204), e.g., from the slice segment header and/or a parameter set such as a PPS or SPS. Video decoder 30 then forms the reference picture list (206).

Next, video decoder 30 decodes motion information for a current block (208). The motion information may include, for example, a reference picture list identifier and a reference index into the reference picture list. Video decoder 30 then predicts the current block (200), e.g., using inter-prediction mode to calculate a predicted block for the current block. More particularly, video decoder 30 uses the reference picture list identifier to identify which reference picture list to use, and the reference index to identify a reference index in the reference picture list. Video decoder 30 then decodes a motion vector for the current block and identifies a reference block in the identified reference picture.

Video decoder 30 may also receive entropy coded data for the current block, such as entropy coded data for coefficients of a residual block corresponding to the current block (212). Video decoder 30 may entropy decode the entropy coded data to reproduce coefficients of the residual block (214). Video decoder 30 may then inverse scan the reproduced coefficients (216), to create a block of quantized transform coefficients. That is, using the inverse scan, video decoder 30 converts a one-dimensional vector to a two-dimensional matrix. Video decoder 30 may then inverse quantize and inverse transform the coefficients to produce a residual block (218). Video decoder 30 may ultimately decode the current block by combining the predicted block and the residual block (220).

In this manner, the method of FIG. 5 represents an example of a method including decoding, by a video decoder, data representative of a value for a picture order count (POC) resetting period identifier, wherein the data is a coded picture of a layer of video data, and wherein the value of the POC resetting period identifier indicates a POC resetting period including the coded picture, and resetting, by the video decoder, at least part of a POC value for the coded picture and POC values for one or more pictures in the layer that are currently stored in a decoded picture buffer (DPB) of the video decoder. The method in this example further includes decoding one or more POC values representative of reference pictures to be included in a reference picture list, constructing the reference picture list based at least in part on the decoded one or more POC values, decoding motion information for a block of the slice, wherein the motion information includes an identifier of the reference picture list and a reference index into the reference picture list, and decoding the block using one of the reference pictures corresponding to the reference index in the reference picture list.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:

decoding, by a video decoder from a slice segment header of a slice of a coded picture, data representative of a value for a picture order count (POC) resetting period identifier, wherein the data is associated with the coded picture of a layer of the video data, wherein the value of the POC resetting period identifier indicates a POC resetting period including the coded picture and wherein the coded picture comprises a POC anchor picture of the POC resetting period; and based at least in part on the POC resetting period identifier, resetting, by the video decoder, at least part of a POC value for the coded picture, wherein resetting comprises:

resetting all bits of the POC value for the POC anchor picture when an indication of a POC resetting type for the POC anchor picture indicates that the POC value for the POC anchor picture is to be fully reset; or resetting most significant bits (MSB) of the POC value when the indication of the POC resetting type for the POC anchor picture indicates that the MSB of the POC value for the POC anchor picture are to be reset.

2. The method of claim 1, wherein resetting the at least part of the POC values for the one or more pictures in the layer that are currently stored in the DPB comprises:

decoding data representative of a POC least significant bits (LSB) value, wherein the data is included in the coded picture; and decrementing POC values for the one or more pictures in the layer that are currently stored in the DPB by the POC LSB value.

3. The method of claim 2, wherein the POC LSB value is equal to a POC LSB value of the POC anchor picture of the POC resetting period.

4. The method of claim 1, further comprising decoding data representative of a two-bit value for the indication of the POC resetting type to be performed for the coded picture, wherein the data is included in the coded picture.

5. The method of claim 4, further comprising:

determining that the POC value for the coded picture is not to be reset when the value for the indication is zero;

determining that only MSB of the POC value for the coded picture are to be reset when the value for the indication is one;

determining that both MSB and least significant bits (LSB) of the POC value for the coded picture are to be reset when the value for the indication is two; and determining that additional POC resetting information is signaled for the coded picture when the value for the indication is three.

6. The method of claim 5, further comprising, when the value for the indication is three, decoding the additional POC resetting information, wherein the additional POC resetting information indicates whether POC MSB of the POC value for the coded picture are to be reset or whether POC MSB and POC LSB of the POC value for the coded picture are to be reset, and wherein the additional POC resetting information indicates an anchor POC LSB value.

7. The method of claim 1, further comprising:

decoding data representative of a value for the indication of the POC resetting type to be performed for the coded picture, wherein the value for the indication indicates that additional POC resetting information is signaled for the coded picture, wherein the data is included in the coded picture;

decoding the additional POC resetting information, wherein the additional POC resetting information indicates an anchor POC least significant bits (LSB) value; and in response to determining that the POC anchor picture for the POC resetting period was lost, using a POC value equal to the anchor POC LSB value when calculating POC values for pictures following the POC anchor picture in decoding order.

8. The method of claim 1, further comprising decoding data of a picture parameter set (PPS) corresponding to the coded picture, wherein the data of the PPS contains an indication that indicates whether POC resetting information is signaled in the coded picture, and wherein decoding the data representative of the value for the POC resetting period identifier comprises decoding the data representative of the value for the POC resetting period identifier when the data of the PPS indicates that the POC resetting information is signaled in the coded picture.

9. The method of claim 8, wherein the data of the PPS that indicates whether the POC resetting information is signaled is signalled in the PPS when a slice_segment_header_extension_present_flag syntax element of the PPS is equal to one.

10. The method of claim 1, further comprising:

decoding one or more POC values representative of reference pictures to be included in a reference picture list;

constructing the reference picture list based at least in part on the decoded one or more POC values;

decoding motion information for a block of the coded picture, wherein the motion information includes an identifier of the reference picture list and a reference index into the reference picture list; and decoding the block using one of the reference pictures corresponding to the reference index in the reference picture list.

11. A method of encoding video data, the method comprising:

encoding, by a video encoder in a slice segment header of a slice of a coded picture, data representative of a value for a picture order count (POC) resetting period identifier, wherein the data is associated with the coded picture of a layer of the video data, wherein the value of the POC resetting period identifier indicates a POC resetting period including the coded picture, and wherein the coded picture comprises a POC anchor picture of the POC resetting period;

determining whether to reset all bits of a POC value for the POC anchor picture or to reset most significant bits (MSB) of the POC value;

based on the determination, encoding data representative of an indication of a POC resetting type, the POC resetting type indicating whether to reset all bits of the POC value for the POC anchor picture or to reset most significant bits (MSB) of the POC value; and based at least in part on the POC resetting period identifier and the POC resetting type, resetting, by the video encoder, at least part of the POC value for the coded picture.

12. The method of claim 2, wherein resetting the at least part of the POC values for the one or more pictures in the layer that are currently stored in the DPB comprises:

determining a POC least significant bits (LSB) value for the POC anchor picture of the POC resetting period; and decrementing POC values for the one or more pictures in the layer that are currently stored in the DPB by the POC LSB value, the method further comprising encoding data representative of the POC LSB value, wherein the data is included in the coded picture.

13. The method of claim 11, wherein encoding the data representative of the indication of the POC resetting type comprises encoding a two-bit value for the indication of the POC resetting type to be performed for the coded picture, wherein the data is included in the coded picture.

14. The method of claim 13, further comprising:
in response to determining that the POC value for the coded picture is not to be reset, encoding zero for the value of the indication;
in response to determining that only MSB of the POC value for the coded picture are to be reset, encoding one for the value of the indication;
in response to determining that both MSB and least significant bits (LSB) of the POC value for the coded picture are to be reset, encoding two for the value of the indication; and
in response to determining that additional POC resetting information is to be signaled for the coded picture, encoding three for the value of the indication.

15. The method of claim 14, further comprising, in response to determining that the additional POC resetting information is to be signaled, encoding the additional POC resetting information, wherein the additional POC resetting information indicates whether POC MSB of the POC value for the coded picture are to be reset or whether POC MSB and POC LSB of the POC value for the coded picture are to be reset, and wherein the additional POC resetting information indicates an anchor POC LSB value.

16. The method of claim 11,
wherein the value for the indication of the POC resetting type indicates that additional POC resetting information is signaled for the coded picture, and wherein the data is included in the coded picture, the method further comprising:
encoding the additional POC resetting information, wherein the additional POC resetting information indicates an anchor POC least significant bits (LSB) value.

17. The method of claim 11, further comprising:
determining whether to encode POC resetting information; and
encoding data of a picture parameter set (PPS) corresponding to the coded picture, wherein the data of the PPS indicates whether the POC resetting information is signaled in the coded picture, and wherein encoding the data representative of the value for the POC resetting period identifier comprises encoding the data representative of the value for the POC resetting period identifier in response to determining to encode the POC resetting information.

18. The method of claim 17, wherein the data of the PPS that indicates whether the POC resetting information is signaled comprises data representative of a slice_segment_header_extension_present_flag syntax element of the PPS.

19. The method of claim 11, further comprising:
constructing a reference picture list including one or more reference pictures;
encoding a block of the coded picture using one of the reference pictures;

encoding motion information for the block, wherein the motion information includes an identifier of the reference picture list and a reference index into the reference picture list corresponding to the one of the reference pictures; and
encoding one or more POC values representative of the reference pictures included in the reference picture list.

20. A device for coding video data, the device comprising:
a memory comprising a decoded picture buffer (DPB) configured to store video data; and
a video coder configured to
code data of a slice segment header of a slice of a coded picture representative of a value for a picture order count (POC) resetting period identifier, wherein the data is associated with the coded picture of a layer of the video data, wherein the value of the POC resetting period identifier indicates a POC resetting period including the coded picture, and wherein the coded picture comprises a POC anchor picture of the POC resetting period, and
reset at least part of a POC value for the coded picture, wherein to reset the at least part of the POC value for the coded picture, the video coder is configured to:
reset all bits of the POC value for the POC anchor picture when an indication of a POC resetting type for the POC anchor picture indicates that the POC value for the POC anchor picture is to be fully reset; and
reset most significant bits (MSB) of the POC value when the indication of the POC resetting type for the POC anchor picture indicates that the MSB of the POC value for the POC anchor picture are to be reset.

21. The device of claim 3, wherein the video coder comprises a video decoder configured to decode data representative of a POC least significant bits (LSB) value, wherein the data is included in the coded picture, and decrement POC values for the one or more pictures in the layer that are currently stored in the DPB by the POC LSB value.

22. The device of claim 21, wherein the POC LSB value is equal to a POC LSB value of the POC anchor picture of the POC resetting period.

23. The device of claim 20, wherein the video coder is further configured to code data representative of a two-bit value for the indication of the POC resetting type to be performed for the coded picture, wherein the data is included in the coded picture.

24. The device of claim 23, wherein the video coder is further configured to determine that the POC value for the coded picture is not to be reset when the value for the indication is zero;
determine that only MSB of the POC value for the coded picture are to be reset when the value for the indication is one;
determine that both MSB and least significant bits (LSB) of the POC value for the coded picture are to be reset when the value for the indication is two; and
determine that additional POC resetting information is signaled for the coded picture when the value for the indication is three.

25. The device of claim 24, wherein the video coder is further configured to, when the value for the indication is three, code the additional POC resetting information, wherein the additional POC resetting information indicates whether POC MSB of the POC value for the coded picture are to be reset or whether POC MSB and POC LSB of the POC value for the coded picture are to be reset, and wherein the additional POC resetting information indicates an anchor POC LSB value.

26. The device of claim 20, wherein the video coder comprises a video decoder configured to
  decode data representative of a value for the indication of the POC resetting type to be performed for the coded picture, wherein the value for the indication indicates that additional POC resetting information is signaled for the coded picture, wherein the data is included in the coded picture,
  decode the additional POC resetting information, wherein the additional POC resetting information indicates an anchor POC least significant bits (LSB) value, and,
  in response to determining that the POC anchor picture for the POC resetting period was lost, using a POC value equal to the anchor POC LSB value when calculating POC values for pictures following the POC anchor picture in decoding order.

27. The device of claim 20, wherein the video coder comprises a video encoder configured to construct a reference picture list including one or more reference pictures, encode a block of the coded picture using one of the reference pictures, encode motion information for the block, wherein the motion information includes an identifier of the reference picture list and a reference index into the reference picture list corresponding to the one of the reference pictures, and encode one or more POC values representative of the reference pictures included in the reference picture list.

28. The device of claim 20, wherein the video coder is configured to code data of a picture parameter set (PPS) corresponding to the coded picture, wherein the data of the PPS indicates whether POC resetting information is signaled in the coded picture, and wherein the video coder is configured to code the data representative of the value for the POC resetting period identifier when the data of the PPS indicates that the POC resetting information is signaled in the coded picture.

29. The device of claim 20, wherein the device comprises at least one of:
  an integrated circuit;
  a microprocessor; and
  a wireless communication device.

30. A device for coding video data, the device comprising:
  means for coding data of a slice segment header of a slice of a coded picture representative of a value for a picture order count (POC) resetting period identifier, wherein the data is associated with the coded picture of a layer of the video data, wherein the value of the POC resetting period identifier indicates a POC resetting period including the coded picture, and wherein the coded picture comprises a POC anchor picture of the POC resetting period; and
  means for resetting at least part of a POC value for the coded picture, wherein the means for resetting comprise:
    means for resetting all bits of the POC value for the POC anchor picture when an indication of a POC resetting type for the POC anchor picture indicates that the POC value for the POC anchor picture is to be fully reset; and
    means for resetting most significant bits (MSB) of the POC value when the indication of the POC resetting type for the POC anchor picture indicates that the MSB of the POC value for the POC anchor picture are to be reset.

31. A non-transitory computer-readable storage medium having stored thereon instructions that, when executed, cause a processor of a device for coding video data to:
  code data of a slice segment header of a slice of a coded picture representative of a value for a picture order count (POC) resetting period identifier, wherein the data is associated with the coded picture of a layer of the video data, wherein the value of the POC resetting period identifier indicates a POC resetting period including the coded picture, and wherein the coded picture comprises a POC anchor picture of the POC resetting period; and
  reset at least part of a POC value for the coded picture, wherein the instructions that cause the processor to reset comprise instructions that cause the processor to:
    reset all bits of the POC value for the POC anchor picture when an indication of a POC resetting type for the POC anchor picture indicates that the POC value for the POC anchor picture is to be fully reset; and
    reset most significant bits (MSB) of the POC value when the indication of the POC resetting type for the POC anchor picture indicates that the MSB of the POC value for the POC anchor picture are to be reset.

32. The non-transitory computer-readable storage medium of claim 4, wherein the instructions that cause the processor to reset the at least part of the POC values for the one or more pictures in the layer that are currently stored in the DPB comprise instructions that cause the processor to:
  code data representative of a POC least significant bits (LSB) value, wherein the data is included in the coded picture; and
  decrement POC values for the one or more pictures in the layer that are currently stored in the DPB by the POC LSB value.

33. The non-transitory computer-readable storage medium of claim 31, further comprising instructions that cause the processor to code data representative of a two-bit value for the indication of the POC resetting type to be performed for the coded picture, wherein the data is included in the coded picture.

34. The non-transitory computer-readable storage medium of claim 33, further comprising instructions that cause the processor to:
  determine that the POC value for the coded picture is not to be reset when the value for the indication is zero;
  determine that only MSB of the POC value for the coded picture are to be reset when the value for the indication is one;
  determine that both MSB and least significant bits (LSB) of the POC value for the coded picture are to be reset when the value for the indication is two; and
  determine that additional POC resetting information is signaled for the coded picture when the value for the indication is three.

35. The non-transitory computer-readable storage medium of claim 34, further comprising instructions that cause the processor to, when the value for the indication is three, code the additional POC resetting information, wherein the additional POC resetting information indicates whether POC MSB of the POC value for the coded picture are to be reset or whether POC MSB and POC LSB of the POC value for the coded picture are to be reset, and wherein the additional POC resetting information indicates an anchor POC LSB value.

36. The non-transitory computer-readable storage medium of claim 31, further comprising instructions that cause the processor to:
  code data representative of a value for the indication of the POC resetting type to be performed for the coded picture, wherein the value for the indication indicates that additional POC resetting information is signaled for the coded picture, wherein the data is included in the coded picture; and
  code the additional POC resetting information, wherein the additional POC resetting information indicates an anchor POC least significant bits (LSB) value.

37. The non-transitory computer-readable storage medium of claim 31, further comprising instructions that cause the processor to code data of a picture parameter set (PPS) corresponding to the coded picture, wherein the data of the PPS indicates whether POC resetting information is signaled in the coded picture, and wherein the instructions that cause the processor to code the data representative of the value for the POC resetting period identifier comprise instructions that cause the processor to code the data representative of the value for the POC resetting period identifier when the data of the PPS indicates that the POC resetting information is signaled in the coded picture.

38. The method of claim 1, wherein resetting further comprises resetting at least part of POC values for one or more pictures in the layer that are currently stored in a decoded picture buffer (DPB) of the video decoder.

39. The method of claim 11, wherein resetting further comprises resetting at least part of POC values for one or more pictures in the layer that are currently stored in a decoded picture buffer (DPB) of the video decoder.

40. The device of claim 20, wherein the video coder is further configured to reset at least part of POC values for one or more pictures in the layer that are currently stored in the DPB.

41. The device of claim 30, further comprising means for resetting at least part of POC values for one or more pictures in the layer that are currently stored in a decoded picture buffer (DPB) of the device.

42. The non-transitory computer-readable storage medium of claim 31, further comprising instructions that cause the processor to reset at least part of POC values for one or more pictures in the layer that are currently stored in a decoded picture buffer (DPB) of the device.

* * * * *

UNITED STATES PATENT AND TRADEMARK OFFICE
CERTIFICATE OF CORRECTION

PATENT NO. : 9,628,820 B2
APPLICATION NO. : 14/543470
DATED : April 18, 2017
INVENTOR(S) : Ye-Kui Wang et al.

Page 1 of 1

It is certified that error appears in the above-identified patent and that said Letters Patent is hereby corrected as shown below:

In the Claims

Column 36, Line 65, Claim 12: replace "claim 2" with -- claim 39 --
Column 38, Line 34, Claim 21: replace "claim 3" with -- claim 40 --
Column 40, Line 28, Claim 32: replace "claim 4" with -- claim 42 --

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*